US012664375B1

(12) United States Patent
Chakraborty et al.

(10) Patent No.: US 12,664,375 B1
(45) Date of Patent: Jun. 23, 2026

(54) RETRAINING A LARGE LANGUAGE MODEL

(71) Applicant: Character Technologies Inc., Palo Alto, CA (US)

(72) Inventors: Satyaki Chakraborty, Sunnyvale, CA (US); Landon Jonquiere Brittan Smith, San Francisco, CA (US); Te-Lin Wu, Menlo Park, CA (US)

(73) Assignee: Character Technologies Inc., Palo Alto, CA (US)

( * ) Notice: Subject to any disclaimer, the term of this patent is extended or adjusted under 35 U.S.C. 154(b) by 0 days.

(21) Appl. No.: 19/208,332

(22) Filed: May 14, 2025

(51) Int. Cl.
*G06F 40/40* (2020.01)

(52) U.S. Cl.
CPC .................................... *G06F 40/40* (2020.01)

(58) Field of Classification Search
CPC ........................................................ G06F 40/40

USPC ............................................................. 704/9
See application file for complete search history.

(56) References Cited

U.S. PATENT DOCUMENTS

| | | | |
|---|---|---|---|
| 12,431,131 | B1 * | 9/2025 | Balasubramaniam .. G10L 15/22 |
| 2024/0330597 | A1 * | 10/2024 | Temraz ................... G06F 40/35 |

* cited by examiner

*Primary Examiner* — Thierry L Pham
(74) *Attorney, Agent, or Firm* — Van Pelt, Yi & James LLP

(57) ABSTRACT

An indication of a problem associated with a response generated by a first artificial intelligence (AI) language model is received. The first AI language model generates one or more modified responses for the response. The one or more modified responses and some or all of a turn-based conversation that included the response are provided to a second AI language model. The first AI language model is retrained based in part on an output of the second AI language model.

18 Claims, 5 Drawing Sheets

300

200

Perform A Turn-Based
Conversation With A
Client Device — 202

Receive An Indication
Of A Problem
Associated With The
Turn-Based
Conversation — 204

Store In A Database
The Turn-Based
Conversation And The
Received Indication — 206

300

Obtain From A Chat History Database A Turn-Based Conversation Log And Associated Indication ⟋ 302

Generate One Or More Modified Responses For The Turn Associated With The Indication ⟋ 304

Provide The One Or More Generated Modified Responses To A Second AI Language Model ⟋ 306

Generate Synthetic Dataset ⟋ 308

400 ⌐

Determine That A Time Condition Has Been Satisfied — 402

Obtain A Synthetic Dataset — 404

Re-Train An AI Language Mode Based On The Obtained Plurality Of Chat Histories, Associated Indications, And Associated Synthetically Generated Responses — 406

Synthetic chat conversation tree (post conversion)

Daily chat conversation tree

RETRAINING A LARGE LANGUAGE MODEL

BACKGROUND OF THE INVENTION

An Artificial Intelligence (AI) chatbot can be trained to interact with users in the context of a narrative using a Large Language Model (LLM). For example, an LLM may be trained to develop a story with a user over a series of conversation turns. Often times, the process of interacting with the LLM in the context of a narrative may involve lengthy exchanges between the user and the LLM. One or more responses from the LLM throughout the lengthy exchange may be unsatisfactory to the user for any number of reasons. For example, the LLM may generate a response that is incongruent with previous aspects of a conversation. The user may be having a conversation with the AI chatbot where the user is walking down the beach with the AI chatbot. The user may state to the AI chatbot "I'm tired of walking, what should I do?" The AI chatbot may respond with a response "Let me tuck you into bed. You seem tired." Such a response doesn't align with the narrative of the conversation.

BRIEF DESCRIPTION OF THE DRA WINGS

Various embodiments of the invention are disclosed in the following detailed description and the accompanying drawings.

DETAILED DESCRIPTION

Figure 1:
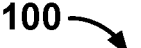
FIG. 1 is a block diagram of a system to improve the ability of an AI chatbot to produce higher quality responses for users in accordance with some embodiments.
Figure 1:
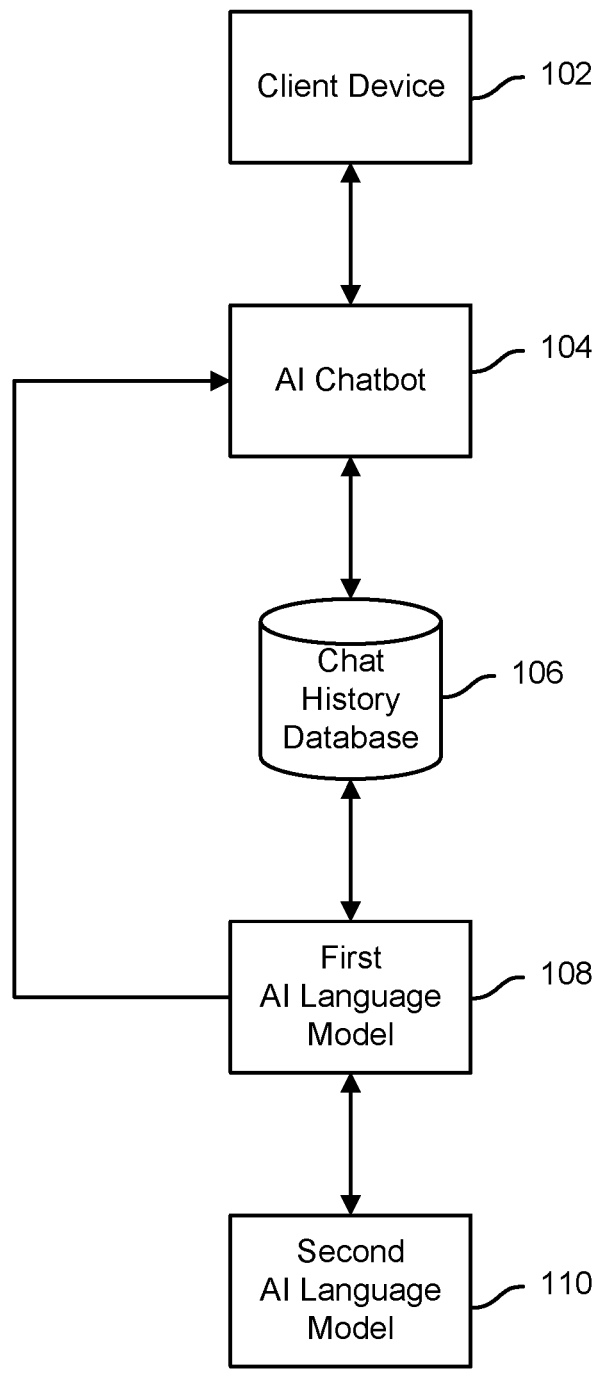

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

AI chatbots are often employed to interact with users through exchanges. AI chatbots may utilize LLMs to interpret users' natural language inputs and respond in natural language. Many AI chatbots such as ChatGPT™, Claude AI™, Google Gemini™, etc. use generalized LLMs. These AI chatbots are able to perform a variety of tasks for users (e.g., write code, solve problems, answer questions, etc.). These generalized AI chatbots may hold long conversations with users with multiple exchanges. For example, an AI chatbot may be able to work with a user to program an entire application.

Some AI chatbots are designed to perform specific tasks for users. For example, an AI chatbot can be designed to engage with a user in a narrative manner. This AI chatbot can develop stories, develop characters in a story, act like a character, world-build, engage in a role-playing conversation etc. Developers of a narrative AI chatbot aim to provide a product that users are able to enjoy, such that they engage with the AI chatbot for long periods of time with many turns.

A turn is any exchange between an AI chatbot and a human user. Turns may be comprised of text messages from an AI chatbot. Turns may comprise other forms of communication such as moving pictures, animations, photos, videos, and/or audio. For example, a user may ask an AI chatbot to develop a scene on a train. The AI chatbot may respond with a moving picture of a train (e.g., a train being zoomed out), a soundtrack, and a text narrative. This may comprise a turn. Turns may consist solely of text. For example, a user could ask for a backstory of a character and the AI chatbot responds with a 500-word brief narrative including a name, a place of origin, etc.

When an AI chatbot is in a turn-based exchange with a user a turn produced by the AI chatbot may include problems from the perspective of the user and/or the developer of the AI chatbot. In some embodiments, the AI chatbot provides a response that is inconsistent with an earlier part of the conversation (e.g., temporal inconsistency). For example, the user may be having a conversation with the AI chatbot where the user mentions that they are broke and depressed. They are having a role-playing conversation with the AI chatbot and ask, "What do I do?" In response, the AI chatbot says "Why don't you go to Japan this time of year?" Such a response is temporally inconsistent with the previous parts of conversation because going on a trip to Japan is expensive, which is not compatible with the user's previous statement of "I'm broke." In some embodiments, the AI chatbot provides a response that is repetitive. For example, the AI chatbot may repeat or rephrase a previous conversation turn in a manner that does not advance the conversation. In some embodiments, the AI chatbot provides a response that does not progress the conversation (i.e., conversation stagnation). In some embodiments, the AI chatbot provides a response that is unsafe. For example, the response may include harmful content, toxic or offensive language, misinformation or disinformation, illegal or unethical guidance, privacy violations, inappropriate or explicit content, etc. Systems and methods are disclosed herein to improve the responses provided by an AI chatbot during a conversation with a user. A plurality of turn-based conversations is performed with a plurality of different users. The different users may provide feedback on the conversations. The user feedback comprises an indication that a response provided by the AI chatbot has a problem. The plurality of conversations is stored with the associated user feedback in a database.

An LLM associated with the AI chatbot is retrained, in part, by obtaining from the database the plurality of turn-based conversations and associated user feedback. For each response, the LLM associated with the AI chatbot is prompted to generate a plurality of modified responses. The modified responses are generated with the intent to alleviate the problem indicated by the user. As an illustration, a modified response may comprise a better response to replace a turn that misremembers a detail. The plurality of modified responses are provided to a second LLM. In response to receiving the plurality of modified responses associated with the response indicated by a user as having a problem, the second LLM ranks the plurality of modified responses.

Modified responses, that have been judged well, are grouped with the associated conversation history and user feedback. This group of data can be used to generate a synthetic dataset for retraining the LLM associated with the AI chatbot. The synthetic dataset comprises set proportions of training data based on user feedback. For example, a synthetic dataset may include 70% responses with no problems, 10% training data associated with memory problems, 10% training data associated with repetition problems, and 10% training data associated with safety problems. This example training dataset may be used to train the AI chatbot to have better performance with regards to memory problems. Other ratios of responses may be used to retrain the LLM associated with the AI chatbot. Training the AI chatbot with the training dataset may be accomplished in a variety of ways (e.g., fine-tuning, full retraining, adapter-based training, reinforcement training from human feedback, etc.).

The systems and methods disclosed herein improve the ability of the AI chatbot to produce higher quality responses for users. The systems and methods disclosed herein can be used to train an AI chatbot to avoid specific problems when engaging in a conversation with the user. This facilitates the creation of an AI chatbot that receives less user feedback and delivers better user experience during a conversation.

FIG. 1 is a block diagram of a system to improve the ability of an AI chatbot to produce higher quality responses for users in accordance with some embodiments. In the example shown, system 100 comprises first AI language model 108 which is associated with AI chatbot 104. In some embodiments, AI chatbot 104 produces turns in a turn-based exchange with client device 102. Second AI language model 110 may be used to train first AI language model 108 such that performance regarding problems associated with a turn-based conversation is improved.

System 100 may be hosted in part by an entity (e.g., company, organization, government, etc.) which would like to improve AI chatbot 104 to produce better interactions with client device 102.

Client device 102 may be a computer, laptop, phone, tablet, server, etc. Client device 102 may be used by a human. The human may be engaging in a turn-based conversation with AI chatbot 104 using client device 102.

AI chatbot 104 facilitates a turn-based conversation with client device 102. Client device 102 may engage with AI chatbot 104 in the turn-based conversation via a User Interface (UI) which allows a user to execute a turn (e.g., type text and send the text to the AI chatbot) and receive a response (e.g., a body of text). In some embodiments, AI chatbot 104 comprises an application which may be downloaded on client device 102 (e.g., a phone application, a desktop application, a tablet application, etc.) which provides a UI for a turn-based exchange. AI chatbot 104 may be comprised of a frontend web application which provides a UI for a turn-based exchange.

AI chatbot 104 is associated with first AI language model 108. In some embodiments, client device 102 enters a turn, AI chatbot 104 sends the turn to first AI language model 108, first language model 108 generates a turn in response, sends the response turn to AI chatbot 104, and AI chatbot 104 provides the response turn to client device 102. This process may be repeated, thus generating a turn-based conversation. The turn history between client device 102 and AI chatbot 104 is stored in chat history database 106.

AI chatbot 104 may provide client device 102 the ability to indicate problems with generated turns. For example, if a user using client device 102 believes that a turn is unsafe, the user may use a feature in a UI associated with AI chatbot 104 to specifically indicate the turn is unsafe. Similarly, the user may use one or more features in the UI to indicate that the turn has problems with memory, is repetitive, does not progress a narrative, etc. In some embodiments, the indications produced by client device 102 are stored in chat history database 106 along with any context of the indication (e.g., the turn-based exchange). The context may include a threshold number of previous turns (e.g., 40 previous turns).

AI chatbot 104 may have a repetition problem when the responses repeat the same phrases, repeat the same actions, or fails to progress a narrative (e.g., a narrative in which a father is hugging his son and the hugging action continues for turn after turn.).

In some embodiments, AI chatbot 104 provides client device 102 the ability to choose between one or more turns. For example, the user may take a turn, and in response, AI chatbot 104 provides one or more responses. In some embodiments, the user is able to provide an indication that the user wants AI chatbot 104 to regenerate the response because the user is unhappy with the AI chatbot 104 response. The user may continue to request AI chatbot 104 to regenerate the response until the user is happy with the response from AI chatbot 104. In some embodiments, AI chatbot 104 provides a plurality of responses. The user may select, via client device 102, one of the plurality of responses. Each of the plurality of responses may progress a narrative in a different manner. AI chatbot 104 may provide client device 102 an interface to choose between one or more of the turns. An example interface may be a swipe.

In some embodiments, AI chatbot 104 provides the user with an interface to generate a text-based description of a problem. For example, the user may be able to describe exactly why the user has flagged a turn for a problem.

Chat history database 106 is any database implementation that stores a plurality of turn-based conversations. Chat based database 106 communicates with AI chatbot 104 and first AI language model 108. This communication allows for turns generated by client device 102 and corresponding response turns generated by first AI language model 108 to be stored. The turns are stored such that their chronological order is maintained.

Chat history database 106 may also store feedback given by the user associated with a turn-based exchange. For example, suppose client device 102 is engaged in a turn-based exchange with AI chatbot 104, in which a user is attempting to develop a narrative where the user is with a character at the beach. In a subsequent turn, the user indicates to AI chatbot 104 that the user is tired. AI chatbot 104 responds with "why don't I tuck you into bed." This is a problematic response, because it has already been established in the turn-based exchange that the user is at the beach. Client device 102 may receive this turn and use a UI associated with AI chatbot 104 to indicate that this turn is inconsistent with the conversation. Chat history database 106 stores this indication and the turn-based exchange that contextualizes this indication.

The stored turn-based exchange comprises turns generated by client device 102 and turns generated by AI chatbot 104. In some embodiments, the stored turn-based exchange includes turns generated before and/or after the turn associated with the indication. In some embodiments, when a user indicates that a turn is problematic all of the turn-based exchange starting from the beginning of the user's interaction with AI chatbot 104 and all subsequent turns are stored in chat history database 106. In some embodiments, when a user indicates that a turn is problematic some of the turn-based exchange starting from a threshold number of previous turns to a most recent turn are stored in chat history database 106.

First AI language model 108 produces turns in response to turns generated by client device 102. First AI language model 108 may comprise a LLM, embedding services, attention mechanisms, tokenizers, preprocessing pipelines, etc. In some embodiments, first AI language model 108 includes a specialized LLM (e.g., an LLM that is specifically configured/trained to engage in narrative based conversations with a user).

First AI language model 108 produces a plurality of modified responses when a turn receives feedback from a user. The plurality of modified responses is provided to second AI language model 110.

For example, client device 102 may flag a turn for memory problems. In response to receiving this feedback from client device 102, first AI language model 108 may produce a plurality of modified responses that attempt to fix the memory issue associated with a turn using the context of the turn that was flagged (e.g., the turns produced before and/or after by the user and/or first AI language model 108).

In some embodiments, the plurality of modified responses is generated at a later time then when the conversation took place. For example, the plurality of modified responses may be generated after a time condition has been satisfied.

The plurality of modified responses is sent to second AI language model 110.

Second AI language model 110 receives the plurality of modified responses and contextual information and ranks the plurality of modified responses. In some embodiments, second AI language model 110 includes a generalized LLM (e.g., Claude AI™, Google Gemini™, ChatGPT™, etc.) Second AI language model 110 may comprise LLMs, Natural Language Processing, text embedding, or any other method/system for ranking modified responses along a certain piece of feedback.

Second AI language model 110 may be optimized for ranking the plurality of modified responses. Second AI language model 110 may use a generalized LLM to provide a service for ranking the plurality of modified responses. This is because generalized LLMs can be proficient at following directions.

Second AI language model 110 may be provided with the context surrounding the plurality of modified responses and told to rank the modified responses based on how well it solves a certain problem (e.g., memory, repetition, safety, etc.). This may be done by providing a prompt to a generalized LLM which includes instructions, context, an issue associated with the original response, the original response, and/or the plurality of modified response. The instructions can instruct the generalized LLM to rank the modified responses based on how well it solves the issue associated with the original response.

As an illustration, suppose a user engages in a turn exchange with AI chatbot 104 about a narrative that takes place on train, where first AI language model 108 generates three turns. Client device 102 receives the hundredth turn from first AI language model 110. The user flags the hundredth turn because it has problems with memory, for example, it forgets that the narrative is taking place on a train and introduces a character that is a flight attendant. Chat history database 106 stores all of the turns, including the turns generated by first AI language model 108 and the user. At a later time, first AI language model 108 is directed to generate a plurality of modified responses for the hundredth turn within the context of the conversation. The plurality of modified responses, the 20 turn exchange, and the information associated with the flag from the user (e.g., that the flag is for memory problems) may be sent to second AI language model 110.

In response, second AI language model 110 is configured to generate feedback on the modified responses based on how each of the modified responses addresses the original user feedback. Referring to the memory example, this may be accomplished by using a prompt on second AI language model 110 which directs it to rank each of the plurality of the modified responses based on well it displays memory in the context of the turn exchange. For example, a modified response which again introduces a flight attendant to a train story will be ranked low on memory, while a modified response which correctly pertains to the narrative on the train will be ranked higher (e.g., introduces a train conductor).

The prompt and the feedback from the user may comprise a query for feedback based on issues other than memory. For example, the user may provide feedback indicating that the original response was repetitive or unsafe. The prompt used on second AI model 110 may be modified to reflect the user feedback, for example, the prompt may request that second AI model 110 rank the alternate responses based on how unsafe the responses are.

In some embodiments, the prompt includes condensed user feedback from a plurality of users. For example, a prompt that is associated with an attempt to train the model regarding memory, may comprise a condensed memory problem description from a plurality of users.

Modified responses that are ranked highly are used to generate a synthetic dataset. The synthetic dataset may be comprised of highly ranked modified responses which are associated with a similar type of user feedback (e.g., memory). The synthetic dataset is used to retrain first AI language model 108 in order to improve the ability of AI chatbot 104 to produce higher quality responses for users. For example, a synthetic dataset associated with highly ranked modified responses may be used to retrain first AI language model 108 to reduce the likelihood that AI chatbot 104 provides a response that has temporal inconsistency issues, is repetitive, does not progress the conversation, and/or is unsafe.

In some embodiments, the synthetic dataset is configured such that it comprises a particular ratio of highly ranked modified responses based on their association with different problems. For example, it may include 10% data from memory problems, 20% data from repetition problems, 30% data from unsafe problems, and 40% data from general problems that are unspecified. In some embodiments, the dataset includes examples which are not associated with any problems. For example, it may include 10% data from memory problems, 20% data from repetition problems, 30% data from unsafe problems, and 40% data with no problems.

Figure 2:
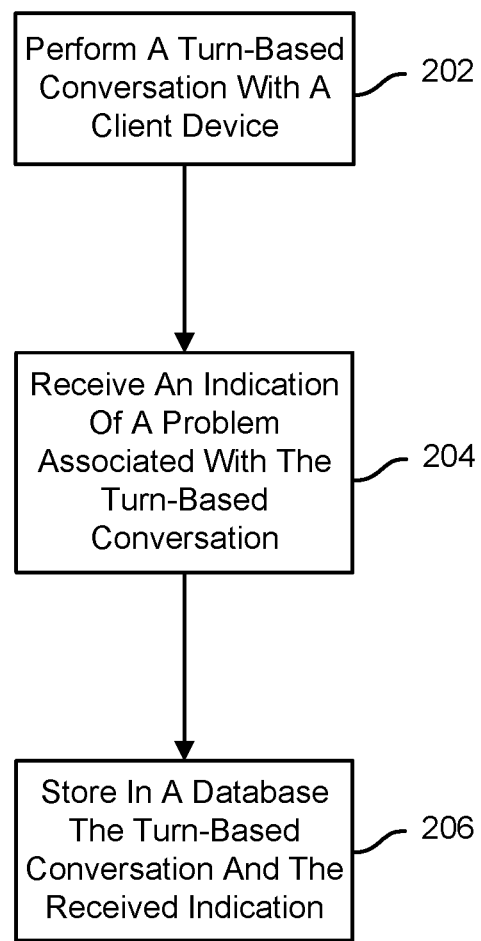
FIG. 2 is a flow diagram of a process for storing a turn-based conversation in accordance with some embodiments.

FIG. 2 is a flow diagram of a process for storing a turn-based conversation in accordance with some embodiments. Process 200 may be executed by an AI chatbot, such as AI chatbot 104. Process 200 may be performed each time the AI chatbot has a turn-based conversation with a client device.

At 202, a turn-based conversation is performed with a client device. A turn-based conversation comprises of an exchange between a user associated with the client device and an AI chatbot. A turn-based conversation comprises a plurality of turns. A turn may be comprised of a variety of different forms of information. In various embodiments, each turn comprises text. However, a turn may comprise other forms of media such as a moving pictures, animations, photos, videos, audio, etc.

A turn-based conservation may be comprised of a user and an AI language model developing a narrative. For example, the narrative could comprise a father and son walking on a beach.

At 204, an indication of a problem associated with the turn-based conversation is received. In some embodiments, an AI chatbot which facilitates the turn-based conversation, provides an interface which allows a client device to indicate a problem associated with the turn-based conversation. For example, a UI may include a button to press when a turn produced by the AI chatbot has a problem. The button may lead to a menu which allows the user to indicate more specifically what the problem is. Examples of problems which may be indicated by the user include problems with memory, redundancy, safety, etc. The user may enter which problem the turn has. In some embodiments, the user is provided a manner with which to provide more detailed feedback associated with the problem (e.g., through a text-box). This may include the user flagging a turn generated by the AI chatbot.

The indication and some or all of the turn-based conversation are sent to a database.

At 206, the turn-based conversation and the received indication is stored in a database. In some embodiments, as the turn-based conversation is performed, each turn is stored in a chat history database. The chronological order of the conversation may be maintained. Furthermore, other information associated with the conversation may be store such as temporal data.

In some embodiments, the same database may store the indication of the problem associated with the turn-based conversation. Furthermore, the database may be used to store which turn within the turn-based conversation which is associated with the indication.

Figure 3:
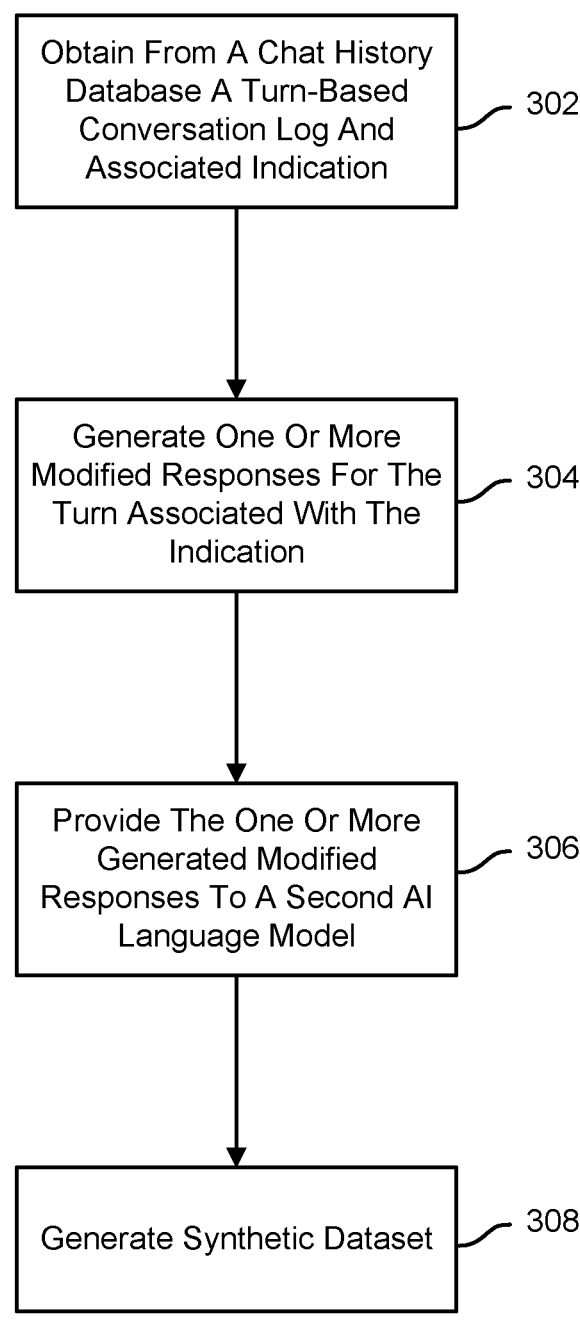
FIG. 3 is a flow diagram of a process for updating a synthetic dataset in accordance with some embodiments.

FIG. 3 is a flow diagram of a process for updating a synthetic dataset in accordance with some embodiments. Process 300 may be executed by an AI language model, such as first AI language model 108. In some embodiments, process 300 occurs at a time after a turn-based conversation occurs.

At 302, a turn-based conversation log and associated indication is obtained from a chat history database. The chat history database may be associated with an AI chatbot. The chat history database may continually store each turn as they are created by the user and the AI chatbot. The chat history database may be any database implementation on any device. The chat history database may store structured data and/or unstructured data.

A turn-based conservation log may be comprised of some or all turns generated by a user and some or all turns generated by an AI chatbot. In some embodiments, the turns generated by the AI chatbot are generated by an AI language model. The turn-based conservation log may maintain the chronological order of the exchange. In some embodiments, other information associated with the turn-based conservation log is stored, such as the temporal data of each turn.

In some embodiments, a turn-based conservation log includes a turn which is associated with an indication. The associated indication may be comprised of an indication that the turn in the turn-based conversation comprises a problem. Examples of problems include redundancy, memory, unsafe language, etc.

At 304, one or more modified responses for the turn associated with the indication are generated. The AI language model is given the context of the turn-based conversation. This context includes the turns produced before the turn with the indication. These turns include turns produced by a user and an AI language model. The context includes the indication. For example, the context may include the indication that a specific turn comprises a problem with memory.

The AI language model may also be prompted with a prompt instructing the model to produce any number of modified responses. In some embodiments, the prompt includes further instructions for the AI language model to attempt to alleviate the problem associated with the indication (e.g., by producing a response modified in a manner to alleviate the problem).

At 306, the one or more generated modified response is provided to a second AI language model. In some embodiments, the second AI language model is instructed to provide feedback on the one or more generated modified responses. For example, feedback may be comprised of ranking the one or more modified responses based on how well the problem associated with the indication is alleviated. In some embodiments, the second AI language model is also provided with any context associated with the modified responses. The context may include the turn-based conversation log and the problem associated with the indication. In some embodiments, the context includes an abridged version of the turn-based conversation log. This may be used by the second AI language model to rank the modified response. For example, the modified responses may need to be ranked on how well they approach a memory issue, therefore, the context of the situation may be provided to ensure that the second AI language model may determine how well the modified response alleviate a memory issue.

At 308, a synthetic dataset is generated. A synthetic dataset includes turns generated by an AI language model. In some embodiments, a synthetic dataset includes modified responses that are generated as part of this process. In some embodiments, the modified responses that are deemed to address the problem indicated by the associated indication are used to generate the synthetic dataset.

A synthetic dataset may be representative of modified responses that are associated with one particular problem. For example, there may be a synthetic dataset associated with memory problems and a separate synthetic dataset associated with repetition problems.

In some embodiments, a synthetic dataset comprises a combined dataset of one or more problems. For example, a synthetic dataset may be comprised of 10% of memory problems and 20% of repetition problems.

In some embodiments, one or more synthetic datasets are used to retrain the AI language model associated with an AI chatbot. In some embodiments, each of the one or more synthetic datasets have unique compositions of training data. These unique compositions may comprise different percentages of data associated with one or more different problems.

Figure 4:
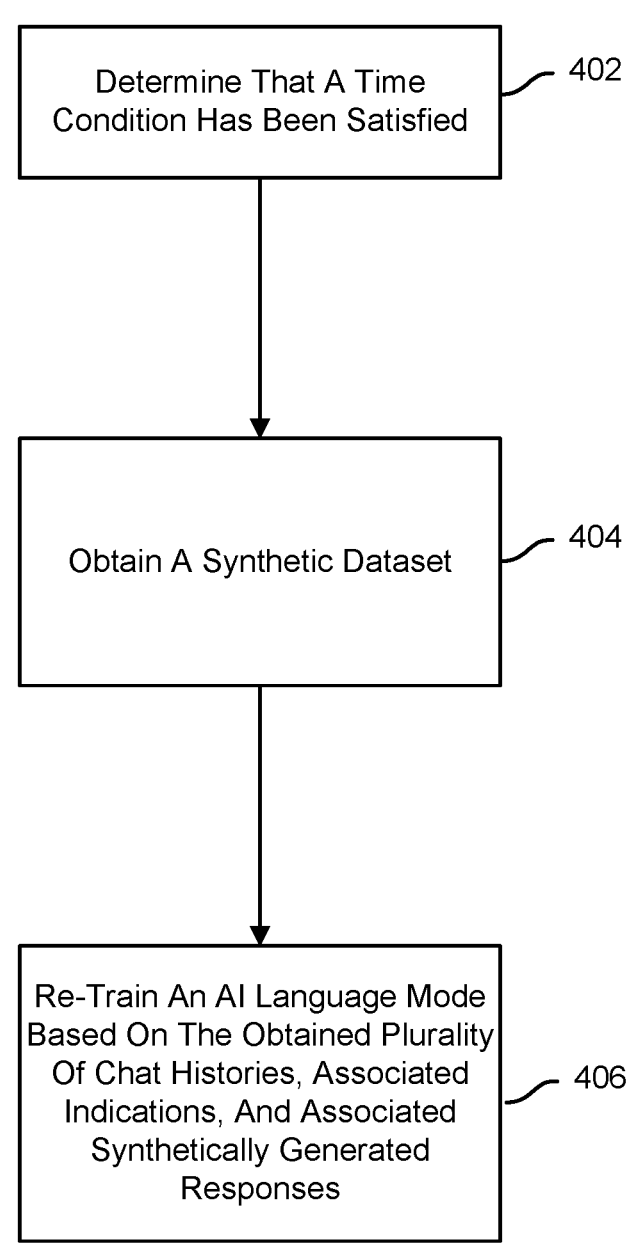
FIG. 4 is a flow diagram of a process for re-training an AI chatbot in accordance with some embodiments.

FIG. 4 is a flow diagram of a process for re-training an AI language model in accordance with some embodiments. In some embodiments, process 400 is executed by an AI language model.

At 402, it is determined that a time condition has been satisfied. In some embodiments, a time condition is a particular amount of time (e.g., one month, sixth months, one year, etc.) since an AI language model was last retrained. In some embodiments, a time condition comprises an amount of time that has elapsed since a turn-based conversation has occurred. In some embodiments, a time condition comprises an amount of time since a turn produced by an AI chatbot has been flagged. In some embodiments, the time condition allows for the context of a flagged turn to be available. A time condition may be satisfied when the amount of time has passed.

At 404, a synthetic dataset is obtained. The synthetic dataset includes a plurality of chat histories, associated indications, and associated synthetically generated responses. The chat histories may be comprised of a plurality turns that are generated by a user and by a AI language model and/or AI chatbot. The associated indications are generated by a user and may comprise the user indicating that a particular turn was problematic. The associated synthetically generated responses may be generated by an AI language model and ranked by a second AI language model. In some embodiments, the synthetically generated responses are modified responses which are determined to solve a problem with a problematic turn.

At 406, an AI language model is retrained based on the synthetic dataset. The indications within the synthetic dataset may be used to designate what the training is meant to improve. For example, a plurality of chat histories and associated generated responses may be associated with a single type of indication (e.g., a problem with memory).

In some embodiments, the AI language model is retrained by using the chat histories as input data and the synthetically generated responses as desired outputs. Using this configuration, the parameters which make up the AI language model may be adjusted such that the desired outputs are more frequently returned when the input data is received. This can be accomplished using a variety of training methods associated with AI language models. For example, an optimization function can be used with back propagation to reconfigure the weights of the AI language model.

In some embodiments, the AI chatbot is re-trained on a synthetic dataset which associated with a single problem. This allows the AI chatbot to be specifically improved in a specific area, such as memory problems. In some embodiments, the AI chatbot is trained on synthetically generated responses which are highly ranked. For example, the AI chatbot may train on synthetically generated responses which a generalized LLM indicates address a problem well.

In some embodiments, the AI chatbot is retrained based on a concatenated dataset which includes data associated with one or more different problems. For example, it may include 10% of data from memory problems, 20% data from repetition problems, 30% data from unsafe problems, and 40% data from general problems that are unspecified. In some embodiments, the dataset includes examples which are not associated with any problems. For example, it may include 10% data from memory problems, 20% data from repetition problems, 30% data from unsafe problems, and 40% data with no problems. In some embodiments, the synthetic dataset comprises ratios of problems such that the training is optimized.

The AI chatbot may be trained using any method or technique to train AI using training data. Examples of training methods include supervised learning, unsupervised learning, reinforcement learning, semi-supervised learning, transferred learning, ensemble learning, deep learning, active learning, . . . , etc.

Figures 5A, 5B:
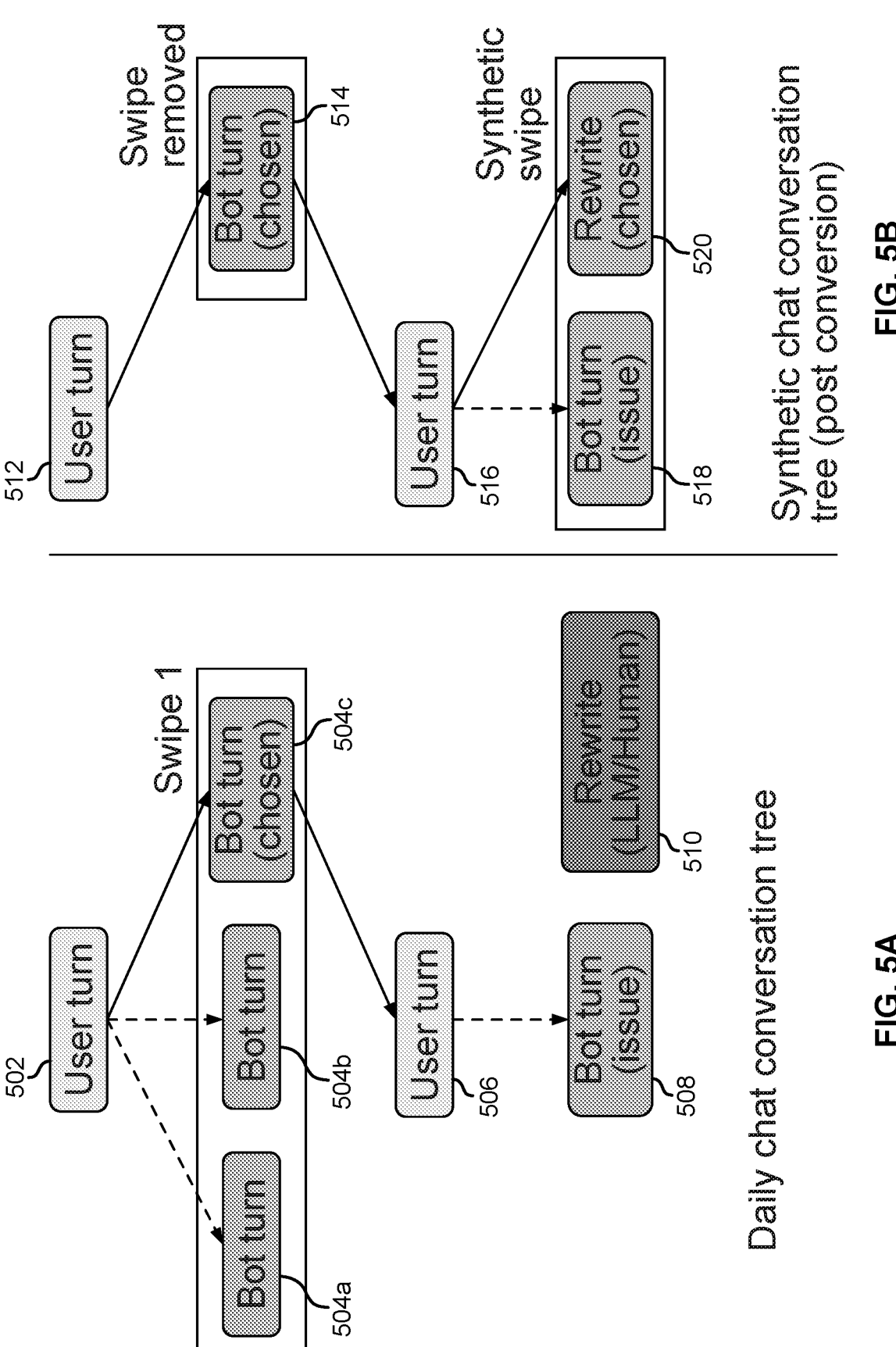
FIG. 5A is an example of a conversation tree comprising a chat with a user in accordance with some embodiments.
FIG. 5B is an example of a synthetic chat conversation tree in accordance with some embodiments.

FIG. 5A is an example of a conversation tree comprising a chat with a user in accordance with some embodiments. User turns 502 and 506 are produced a user. The user may use a client device to produce the user turns. Bot turns 504a, 504b, and 504c are produced in response to user turn 502 by an AI chatbot and/or an AI language model. The turns represent a turn-based exchange between a user and an AI chatbot.

User turn 502 and 506 may be comprised of text generated by the user. User turn 502 is sent to an AI chatbot. User turn 502 may be text that begins an interaction with an AI chatbot (e.g., produced by the user with the intent to engage in a longer exchange with the AI chatbot). In some embodiments, user turn 504 is associated with a narrative.

Bot turns 504a, 504b, and 504c are three turns that are produced by an AI chatbot in response to user turn 502. Bot turns 504a, 504b, and 504c may be comprised of text generated by the AI chatbot. In this example, in response to user turn 502, the AI chatbot produces three turns. In some embodiments, the AI chatbot may produce more or less bot turns.

In some embodiments, a first bot turn (e.g., bot turn 504a) is shown to the user. The user may be provided with an interface which allows the user to choose a preferred turn. The user may indicate that it has a problem with the first bot turn and perform an action (e.g., a swipe, clicking an "X", hitting a key, etc.) which causes the AI chatbot to produce a second bot turn (e.g., 504b). This process may continue until a bot turn is chosen by the user (e.g., bot turn 504c).

In some embodiments, the turn does not have a problem. However, the user still indicates that it does not like the turn. For example, the user may want the chatbot to take the narrative in another direction.

In some embodiments, only a subset of the bot turns produced by the AI chatbot are provided to the user. For example, in response to a user turn, an AI chatbot may provide a user with two bot turns and give the user a choice between the turns.

In some embodiments, only one bot turn is provided to the user. In some embodiments, one turn is provided to the user, but one or more alternate bot turns have been produced by the AI chatbot.

In this example, the user chooses bot turn 504c. The user then responds to the bot turn with user turn 506.

User turn 506 comprises a response to bot turn 504c. In some embodiments, user turn 506 is comprised of text. For example, user turn 506 may comprise a continuation of a narrative that was started with user turn 502 and continues with bot turn 504c. In response to the user turn 506, the AI chatbot responds with bot turn (issue) 508.

Bot turn (issue) 508 comprises text produced by the AI chatbot, with which the user has indicated there is an issue. The user may indicate an issue with a bot turn using a UI. Examples of issues include problems with memory, safety, progressing the narrative, etc. In some embodiments, the user continues the conversation despite the issue. In some embodiments, the user ends the conversation. This is an example of a turn-based conversation which may be stored on a database.

Rewrite 510 comprises a rewritten bot turn. Rewrite 510 can be rewritten by a human and/or an AI language model. In this example, rewrite 510 is a rewritten version of bot turn (issue) 508.

The entity that generates rewrite 510 may use the context of the conversation to generate rewrite 510. The context of the conversation includes bot turns, user turns, and any indication produced by the user. In this example, the context of the conversation may include user turn 502, bot turn 504c, user turn 506, and bot turn (issue 508).

There may be one or more rewrites. In some embodiments, rewrite 510 is used to retrain an AI language model. In some embodiments, rewrite 510 is produced after a time condition from when the original conversation took place is satisfied.

FIG. 5B is an example of a synthetic chat conversation tree in accordance with some embodiments. In this example, the synthetic chat conversation tree comprises one or more turns that are part of an exchange between a user and an AI chatbot. This exchange may have taken place at a previous time. This turn-based exchange sequence may be a part of a synthetic dataset which is used to retrain an AI language model.

User turn 512 may be comprised of text generated by a user and sent to an AI chatbot. User turn 512 may comprises text which begins a narrative with an AI chatbot. User turn 512 is sent to the AI chatbot. For example, the text might be "write me an action story that takes place on a train."

Bot turn 514 is a text-based response to user turn 512 which is produced by a AI chatbot. In some embodiments, bot turn 514 is one bot turn out of a set of bot turns, that has been chosen by the user. For example, bot turn 514 may be bot turn 504c of FIG. 5A. In some embodiments, bot turn 514 is chosen because it possesses the most desirable qualities from the perspective of the user.

In this example, the chat conversation tree has the bot turns which were not chosen (e.g., bot turn 504a and/or bot turn 504b) removed from the chat conversation history. Thus, the noise from the bot turns that were not chosen do not affect the synthetic dataset which is used for training.

User turn 516 is a text-based turn produced in response to bot turn 514. User turn 516 is sent to the AI chatbot.

Bot turn (issue) 518 comprises text produced by the AI chatbot, for which the user has indicated there is an issue with. The user may indicate an issue with a bot turn using a UI. Examples of issues include problems with memory, safety, progressing the narrative, etc.

Rewrite (chosen) 520 comprises a rewritten bot turn. Rewrite (chosen) 520 can be rewritten by a human and/or an AI language model. In this example, rewrite (chosen)_520 is a rewritten version of bot turn (issue) 518. Rewrite (chosen) 520 may have been rewritten using the context of the conversation. In some embodiments, rewrite (chosen) 520 may be one rewritten bot turns of a set of rewritten bot turns. Rewrite (chosen) 520 may be chosen from a set of bot turns using a variety of methods. For example, rewrite (chosen) 520 may be chosen using an AI method of ranking rewritten bot turns. It may be chosen by a human.

In some embodiments, rewrite (chosen) 520 is chosen after a set of rewritten bot turns are produced, the set is ranked by an AI language model based on how well it responds to an issue (e.g., the issue indicated by the user associated with bot turn (issue) 518), and the highest ranked rewritten bot turn is chosen.

With the bot turn 514 and rewrite (chosen) 520 specified, the turn-based exchange of FIG. 5B may be included in a synthetic dataset. This turn-based exchange can be used as training data which is associated with a particular issue which is associated with bot turn (issue) 518. The synthetic dataset can be used to retrain an AI language model, using any of the training methods previously discussed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a plurality of indications of a plurality of different problems associated with a plurality of responses generated by a first artificial intelligence (AI) language model;
generate by the first AI language model a plurality of modified responses for the plurality of responses;
provide to a second AI language model the plurality of modified responses and some or all of a turn-based conversation that included a corresponding response of the plurality of responses, wherein the second AI language model ranks the plurality of modified responses based on how well each of the plurality of modified responses responds to a corresponding problem of the plurality of different problems that was indicated and provides the ranking to the first AI language model;
generate a synthetic dataset by combining the plurality of modified responses and the some or all of a turn-based conversation that included the response based on the ranking, wherein the synthetic dataset includes different proportions of data associated with different problems of the plurality of different problems; and
retrain the first AI language model using the synthetic dataset; and
a memory coupled to the processor and configured to provide the processor with instructions.

2. The system of claim 1, wherein the processor is further configured to perform the turn-based conversation with a client device.

3. The system of claim 1, wherein the turn-based conversation comprises a narrative.

4. The system of claim 1, wherein the processor is further configured to store the turn-based conversation and a received indication of the plurality of indications in a database.

5. The system of claim 1, wherein a problem of the plurality of different problems is one of the following: memory problems, repetition problems, conversation stagnation, or safety problems.

6. The system of claim 1, wherein the second AI language model is configured to provide feedback associated with the plurality of modified responses.

7. The system of claim 1, wherein the processor is further configured to re-train the first AI language model using one or more synthetic datasets, wherein the one or more synthetic datasets includes some or all of the turn-based conversation.

8. The system of claim 1, wherein the processor is further configured to re-train the first AI chatbot language model using one or more synthetic datasets, wherein each of the one or more synthetic datasets comprises proportions of training data associated with different problems.

9. The system of claim 1, wherein an indication of the plurality of indications includes a text description of the problem associated with a response of the plurality of responses.

10. The system of claim 1, wherein a problem of the plurality of different problems associated with a response of the plurality of responses is chosen by a user.

11. The system of claim 1, wherein the processor is further configured to determine that a time condition has been satisfied, wherein the first AI language model is retrained in response to a determination that the time condition has been satisfied.

12. The system of claim 1, wherein the synthetic dataset includes unproblematic data, wherein the unproblematic data includes a plurality of unproblematic responses.

13. A method, comprising:
  receiving a plurality of indications of a plurality of different problems associated with a plurality of responses generated by a first artificial intelligence (AI) language model;
  generating by the first AI language model a plurality of modified responses for the plurality of responses;
  providing to a second AI language model the plurality of modified responses and some or all of a turn-based conversation that included a corresponding response of the plurality of responses, wherein the second AI language model ranks the plurality of modified responses based on how well each of the plurality of modified responses responds to a corresponding problem of the plurality of different problems that was indicated and provides the ranking to the first AI language model;
  generating a synthetic dataset by combining the plurality of modified responses and the some or all of a turn-based conversation that included the response based on the ranking, wherein the synthetic dataset includes different proportions of data associated with different problems of the plurality of different problems; and
  retraining the first AI language model using the synthetic dataset.

14. The method of claim 13, further comprising performing the turn-based conversation with a client device.

15. The method of claim 14, further comprising storing the turn-based conversation and a received indication of the plurality of indications in a database.

16. The method of claim 14, wherein a problem of the plurality of different problems is one of the following: memory problems, repetition problems, conversation stagnation, or safety problems.

17. The method of claim 14, wherein the second AI language model is configured to provide feedback associated with the plurality of modified responses.

18. A computer program product embodied in a non-transitory computer readable medium and comprising computer instructions for:
  receiving a plurality of indications of a plurality of different problems associated with a plurality of responses generated by a first artificial intelligence (AI) language model;
  generating by the first AI language model a plurality of modified responses for the plurality of responses;
  providing to a second AI language model the plurality of modified responses and some or all of a turn-based conversation that included a corresponding response of the plurality of responses, wherein the second AI language model ranks the plurality of modified responses based on how well each of the plurality of modified responses responds to a corresponding problem of the plurality of different problems that was indicated and provides the ranking to the first AI language model;
  generating a synthetic dataset by combining the plurality of modified responses and the some or all of a turn-based conversation that included the response based on the ranking, wherein the synthetic dataset includes different proportions of data associated with different problems of the plurality of different problems; and
  retraining the first AI language model using the synthetic dataset.

* * * * *